United States Patent
Kato

(10) Patent No.: US 12,530,948 B2
(45) Date of Patent: Jan. 20, 2026

(54) SECURITY CAMERA MONITORING SYSTEM AND SECURITY CAMERA MONITORING METHOD

(71) Applicant: NEC Corporation, Tokyo (JP)

(72) Inventor: Takeshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/741,944

(22) Filed: Jun. 13, 2024

(65) Prior Publication Data

US 2024/0420554 A1    Dec. 19, 2024

(30) Foreign Application Priority Data

Jun. 19, 2023    (JP) .................. 2023-100127

(51) Int. Cl.
| | |
|---|---|
| *G08B 13/196* | (2006.01) |
| *G08B 29/00* | (2006.01) |
| *G08B 29/04* | (2006.01) |
| *H04B 10/114* | (2013.01) |
| *H04N 7/18* | (2006.01) |
| *H04N 7/22* | (2006.01) |
| *H04N 17/00* | (2006.01) |

(52) U.S. Cl.
CPC ............ *G08B 13/196* (2013.01); *G08B 29/00* (2013.01); *G08B 29/046* (2013.01); *H04B 10/114* (2013.01); *H04N 7/183* (2013.01); *H04N 7/22* (2013.01); *H04N 17/002* (2013.01)

(58) Field of Classification Search
CPC ...... G08B 13/196; G08B 29/00; G08B 25/10; G08B 29/046; H04B 10/114; H04N 7/183; H04N 7/22; H04N 17/002
See application file for complete search history.

(56) References Cited

U.S. PATENT DOCUMENTS 7,650,144 B2 * 1/2010 Nakamura ............ H04W 48/18
455/418
9,883,146 B2 * 1/2018 Kobayashi ..... H04N 21/234327
(Continued)

FOREIGN PATENT DOCUMENTS

| JP | 2000-022632 A | 1/2000 |
|---|---|---|
| JP | 2000-222647 A | 8/2000 |

(Continued)

*Primary Examiner* — John A Tweel, Jr.
(74) *Attorney, Agent, or Firm* — Sughrue Mion, PLLC

(57) ABSTRACT

A security camera monitoring system includes: a first communication apparatus that is attached to a security camera and can transmit, via optical space communication, image data obtained by the security camera to a second communication apparatus; the second communication apparatus that can receive the image data transmitted from the first communication apparatus; and a monitoring apparatus that can communicate with the second communication apparatus and monitors whether or not there is an interference from outside with respect to the security camera, the monitoring apparatus including at least one first processor which carries out a detection process of detecting a transmission failure of the image data from the first communication apparatus to the second communication apparatus, and a generation process of generating, based on a detection result in the detection process, a signal indicating occurrence of the interference.

9 Claims, 4 Drawing Sheets

(56) References Cited

U.S. PATENT DOCUMENTS

| | | | |
|---|---|---|---|
| 9,948,906 B2 * | 4/2018 | Takeuchi | G08B 29/046 |
| 11,288,937 B2 * | 3/2022 | Siu | G08B 13/19632 |

FOREIGN PATENT DOCUMENTS

| | | | |
|---|---|---|---|
| JP | 2000-285328 A | 10/2000 | |
| JP | 2008-028756 A | 2/2008 | |
| JP | 4803376 B2 | 10/2011 | |

* cited by examiner

FIG. 1
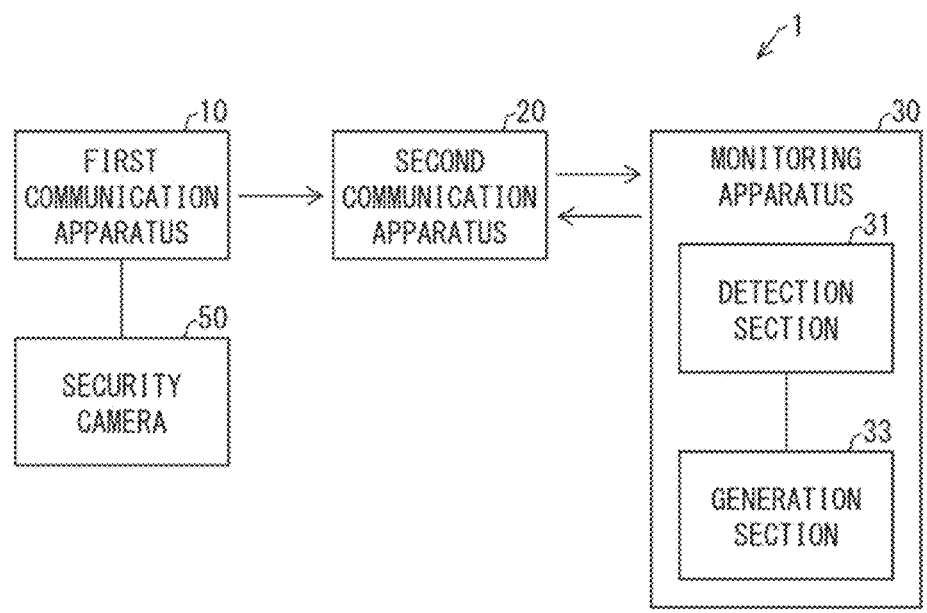
FIG. 2
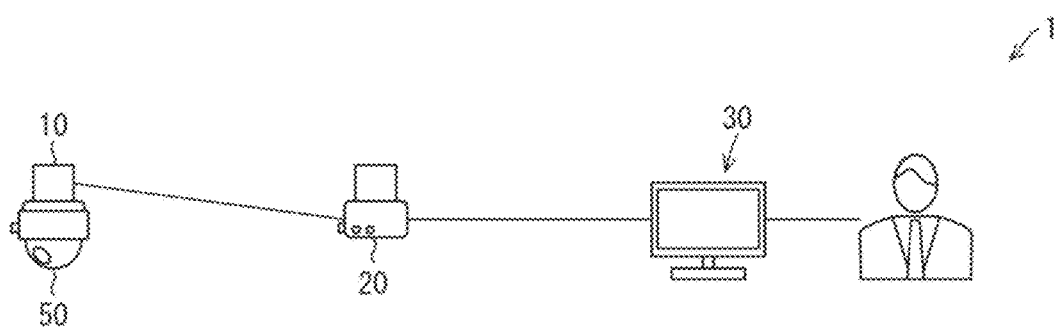
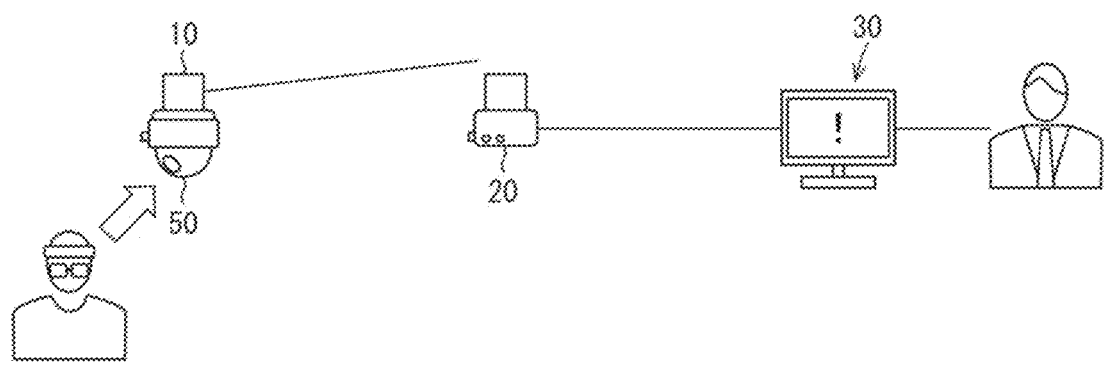

SECURITY CAMERA MONITORING SYSTEM AND SECURITY CAMERA MONITORING METHOD

This Nonprovisional application claims priority under 35 U.S.C. § 119 on Patent Application No. 2023-100127 filed in Japan on Jun. 19, 2023, the entire contents of which are hereby incorporated by reference.

TECHNICAL FIELD

The present invention relates to a security camera monitoring system and a security camera monitoring method.

BACKGROUND ART

A mechanism is widely spreading in which an abnormality such as an unauthorized invasion is detected from an image captured by a security camera. A technique of recognizing an interference action with respect to a surveillance camera is also known. For example, Patent Literature 1 discloses a technique in which whether or not a sudden image change has occurred is checked by comparing an image obtained by a surveillance camera with a reference image, and whether or not there is an interference with the surveillance camera is notified.

CITATION LIST

Patent Literature

[Patent Literature 1]
Japanese Patent No. 4803376

SUMMARY OF INVENTION

Technical Problem

For the conventional technique, it is necessary to introduce a mechanism for detecting whether or not there is an interference with the surveillance camera, separately from the surveillance camera. This leads to a problem that the equipment cost is high.

An example aspect of the present invention is accomplished in view of the above problem, and an example object thereof is to provide a technique which can detect, with a simple mechanism, whether or not there is an interference with a surveillance camera (security camera).

Solution to Problem

A security camera monitoring system in accordance with an example aspect of the present invention includes: a first communication apparatus that is attached to a security camera and is capable of transmitting, via optical space communication, image data obtained by the security camera to a second communication apparatus which is a communication partner; the second communication apparatus that is capable of receiving the image data transmitted from the first communication apparatus; and a monitoring apparatus that is configured so as to be capable of communicating with the second communication apparatus and monitors whether or not there is an interference from outside with respect to the security camera, the monitoring apparatus including at least one first processor, the at least one first processor carrying out a detection process of detecting a transmission failure of the image data from the first communication apparatus to the second communication apparatus, and a generation process of generating, based on a detection result in the detection process, a signal that indicates occurrence of the interference.

A security camera monitoring method in accordance with an example aspect of the present invention includes: transmitting, via optical space communication, image data obtained by a security camera from a first communication apparatus to a second communication apparatus which is a communication partner, the first communication apparatus being attached to the security camera; detecting a transmission failure of the image data from the first communication apparatus to the second communication apparatus; and generating, in a case where the transmission failure has been detected in the detecting, a signal indicating occurrence of an interference from outside with respect to the security camera.

A non-transitory storage medium in accordance with an example aspect of the present invention stores a security camera monitoring program which causes a computer to carry out: a process of transmitting, via optical space communication, image data obtained by a security camera from a first communication apparatus to a second communication apparatus which is a communication partner, the first communication apparatus being attached to the security camera; a process of detecting a transmission failure of the image data from the first communication apparatus to the second communication apparatus; and a process of, in a case where the transmission failure has been detected in the process of detecting, generating a signal indicating occurrence of an interference from outside with respect to the security camera.

Advantageous Effects of Invention

According to an example aspect of the present invention, it is possible to detect, with a simple mechanism, whether or not there is an interference from outside with respect to the security camera.

BRIEF DESCRIPTION OF DRAWINGS

FIG. 1 is a block diagram illustrating a configuration of a security camera monitoring system in accordance with a first example embodiment of the present invention.

FIG. 2 is a diagram illustrating a specific example in which a security camera monitoring process is applied which is carried out by the security camera monitoring system illustrated in FIG. 1.

EXAMPLE EMBODIMENTS

First Example Embodiment

Figure 3:
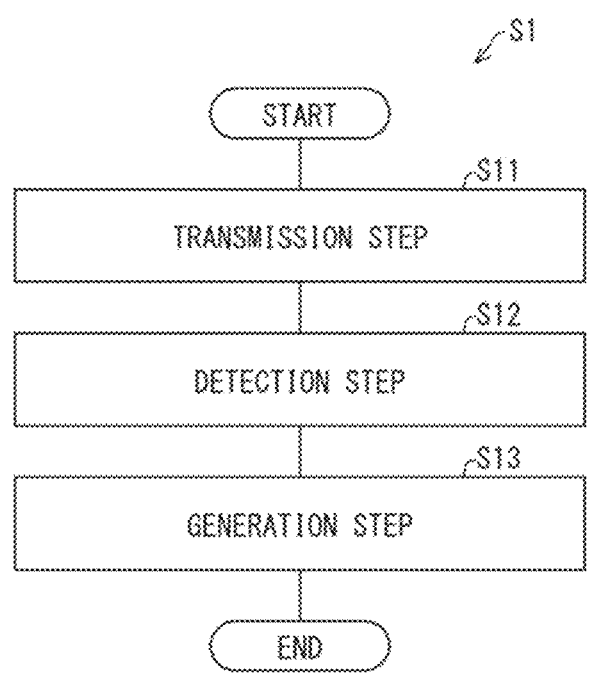
FIG. 3 is a flowchart for describing a security camera monitoring method which is carried out by the security camera monitoring system illustrated in FIG. 1.

The following description will discuss a first example embodiment of the present invention in detail with reference to the drawings. The present example embodiment is a basic form of example embodiments described later.

(Configuration of Security Camera Monitoring System)

The following description will discuss a configuration of a security camera monitoring system 1 in accordance with the present example embodiment, with reference to FIG. 1. FIG. 1 is a block diagram illustrating the configuration of the security camera monitoring system 1. The security camera monitoring system 1 includes a first communication apparatus 10, a second communication apparatus 20, and a monitoring apparatus 30. The first communication apparatus 10 is attached to a security camera 50, and is configured so as to be capable of transmitting, via optical space communication, image data obtained by the security camera 50 to the second communication apparatus 20 which is a communication partner. The second communication apparatus 20 is configured so as to be capable of receiving image data which is transmitted from the first communication apparatus 10. The monitoring apparatus 30 is configured so as to be capable of communicating with the second communication apparatus 20, and is configured to monitor whether or not there is an interference from outside with respect to the security camera 50.

The following description will discuss, with reference to FIG. 2, a specific example in which a security camera monitoring process is applied which is carried out by the security camera monitoring system 1. The security camera monitoring system 1 is a system for monitoring whether or not there is an interference from outside with respect to the security camera 50 in an environment in which the security camera 50 is installed on an indoor ceiling. In the present example embodiment, the interference from outside with respect to the security camera 50 is intended to mean, for example, disabling a security function that the security camera originally has. A more specific example is that a malicious person directly or indirectly touches the security camera 50 to intentionally change an imaging range of the security camera 50. Examples of the intentional change of the imaging range include rotating the security camera 50 itself so that an imaging direction of the security camera 50 is oriented toward a "location where security is unnecessary" such as a ceiling or a wall. Note that the specific example is not limited to the case where the imaging direction is intentionally changed in this manner.

In a case where such an interference causes a position or posture of the security camera 50 itself to change from a regular position or posture, a position or posture of a constituent element attached to the security camera 50 also changes. In the present example embodiment, the first communication apparatus 10 is attached to the security camera 50. With the configuration, a position or posture of the first communication apparatus 10 also changes in response to an interference with the security camera 50. The present example embodiment provides a mechanism for monitoring, based on whether or not the position or posture of the first communication apparatus 10 has changed, whether or not the security camera 50 has received an interference.

The first communication apparatus 10 is, for example, attached to a surface of the security camera 50. In the example illustrated in FIG. 2, the first communication apparatus 10 is fixed to a surface of a cylindrical outer shell of the security camera 50.

The first communication apparatus 10 transmits image data obtained by the security camera 50 to the second communication apparatus 20 via optical space communication. A position or posture of the first communication apparatus 10 is set in a manner in which a direction in which a communication medium is transmitted (i.e., a direction in which image data is transmitted) is oriented toward the second communication apparatus 20 in a regular state (normal state) so that the image data can be transmitted to the second communication apparatus 20. The regular state (normal state) indicates a state in which monitoring by the security camera starts, i.e., a state in which the security camera has been attached at a predetermined position or in a predetermined posture, and a state in which no interference is received during operation. Such a state can be achieved by, for example, positioning the first communication apparatus 10 at a point in time when the security camera 50 is installed on a ceiling and operation is started.

The communication medium (including the image data obtained by the security camera 50) which is transmitted from the first communication apparatus 10 can be referred to also as a directional communication medium. Specific examples of the directional communication medium do not limit the present example embodiment, and include high frequency range electromagnetic waves having a frequency of approximately 10 GHz or more. Electromagnetic waves falling within such a frequency range can include millimeter waves, submillimeter waves, infrared light, visible light, ultraviolet light, and the like. For example, the electromagnetic waves in the above-described frequency range are oriented and transmitted within a predetermined angle range, and thus the electromagnetic waves are used as the above-described directional communication medium. The first communication apparatus 10 can be configured to include, for example:

a beam-forming antenna that orients and transmits millimeter waves or submillimeter waves within a predetermined angle range;

a collimator that collimates infrared light, visible light, or ultraviolet light;

a laser oscillator that generates a laser beam of infrared light, visible light, or ultraviolet light; or the like.

The second communication apparatus 20 is configured so as to be capable of carrying out optical space communication with the first communication apparatus 10. The second communication apparatus 20 receives a communication medium (including image data obtained by the security camera 50) which is transmitted by the first communication apparatus 10 at the position or in the posture in a regular state (normal state). The second communication apparatus 20 is, for example, provided in the vicinity of a place where the first communication apparatus 10 is provided.

The second communication apparatus 20 can carry out wired or wireless communication with the monitoring apparatus 30.

The monitoring apparatus 30 includes a detection section 31 and a generation section 33, as illustrated in FIG. 1. The detection section 31 and the generation section 33 are examples of the at least one first processor. The detection section 31 detects a transmission failure of image data from the first communication apparatus 10 to the second communication apparatus 20. The generation section 33 generates a signal indicating occurrence of the interference based on a detection result by the detection section 31.

In a case where transmission of image data from the first communication apparatus 10 to the second communication apparatus 20 is not carried out, in other words, in a case where the second communication apparatus cannot receive image data (from the first communication apparatus 10), the detection section 31 of the monitoring apparatus 30 detects a "transmission failure". For example, a configuration is employed in which, when the image data (from the first communication apparatus 10) has been received by the second communication apparatus 20, the image data is transmitted from the second communication apparatus 20 to the monitoring apparatus 30. In this configuration example, in a case where the monitoring apparatus 30 cannot receive the image data from the second communication apparatus 20, the detection section 31 detects a "transmission failure" described above. With this configuration, the monitoring apparatus 30 can identify, based on the fact that transmission of the image data from the first communication apparatus 10 to the second communication apparatus 20 has not been carried out, that the transmission direction of the communication medium of the first communication apparatus 10 has changed, that is, the position or posture of the security camera 50 has improperly changed. The improper change indicates, in short, that the security camera 50 has received the foregoing interference.

The monitoring apparatus 30 is configured such that, in a case where the detection section 31 has detected a "transmission failure", the generation section 33 generates a signal indicating occurrence of an interference. Here, the signal includes, for example, a signal related to specific image information displayed on a display apparatus in the case where the monitoring apparatus 30 includes the display apparatus.

As described above, the security camera monitoring system 1 in accordance with the present example embodiment employs the configuration of including: the first communication apparatus 10 that is attached to the security camera 50 and is capable of transmitting, via optical space communication, image data obtained by the security camera 50 to the second communication apparatus 20 which is a communication partner; the second communication apparatus 20 that is capable of receiving the image data transmitted from the first communication apparatus 10; and the monitoring apparatus 30 that is configured so as to be capable of communicating with the second communication apparatus 20 and monitors whether or not there is an interference from outside with respect to the security camera 50, the monitoring apparatus 30 including the detection section 31 for detecting a transmission failure of the image data from the first communication apparatus 10 to the second communication apparatus 20, and the generation section 33 for generating, based on a detection result by the detection section 31, a signal that indicates occurrence of the interference. Therefore, according to the security camera monitoring system 1 in accordance with the present example embodiment, it is not necessary to provide a mechanism that is used only for monitoring the security camera 50, and the mechanism that externally transmits the image data obtained by the security camera 50 has also the function to monitor the security camera 50. This makes it possible to bring about an example advantage of detecting, with a simpler mechanism than conventional techniques, whether or not there is an interference from outside with respect to the security camera.

In the present example embodiment, the example has been described in which, in regard to an interference from outside with respect to the security camera 50, a malicious person directly or indirectly touches the security camera 50. Note, however, that the present example embodiment is not limited to this example. Another example of disabling the security function of the security camera is to cover the security camera 50. In this case also, the position or posture of the security camera 50 moves (deviates) when the cover is applied, and thus a "transmission failure" as described above occurs. Therefore, according to the configuration of the present example embodiment, it is possible also in this case to identify that an interference has occurred.

In a case where the security camera 50 is provided with an insertion port for a storage apparatus (such as a USB), there is a risk of tampering with image data. However, even in this case, the position or posture of the security camera 50 itself moves, even though slightly, in operation of inserting the storage apparatus into the insertion port. Therefore, a "transmission failure" as described above occurs. Therefore, according to the configuration of the present example embodiment, it is possible also in this case to identify that an interference has occurred.

(Flow of Security Camera Monitoring Method)

The following description will discuss a flow of a security camera monitoring method S1 in accordance with the present example embodiment, with reference to FIG. 3. FIG. 3 is a flowchart illustrating the flow of the security camera monitoring method S1.

The security camera monitoring method S1 includes a transmission step S11, a detection step S12, and a generation step S13.

In the transmission step S11, image data obtained by the security camera 50 is transmitted, via optical space communication, from the first communication apparatus 10, which is attached to the security camera 50 illustrated in FIG. 1 and FIG. 2, to the second communication apparatus 20 which is a communication partner.

In the detection step S12, following the transmission step S11, a transmission failure of the image data from the first communication apparatus to the second communication apparatus is detected. The detection is carried out by the detection section 31 of the monitoring apparatus 30 illustrated in FIG. 2. The detection section 31 has already been described, and therefore the description thereof will be omitted here.

In the generation step S13, in a case where a transmission failure has been detected in the detection step S12, a signal indicating occurrence of an interference from outside with respect to the security camera 50 is generated. The generation of the signal is carried out by the generation section 33 of the monitoring apparatus 30 illustrated in FIG. 2. The generation section 33 has already been described, and therefore the description thereof will be omitted here.

As described above, the security camera monitoring method S1 in accordance with the present example embodiment employs the configuration of including: transmitting, via optical space communication, image data obtained by a security camera from a first communication apparatus to a second communication apparatus which is a communication partner, the first communication apparatus being attached to the security camera; detecting a transmission failure of the image data from the first communication apparatus to the second communication apparatus; and generating, in a case where the transmission failure has been detected in the detecting, a signal indicating occurrence of an interference from outside with respect to the security camera. Therefore, according to the security camera monitoring method S1 in accordance with the present example embodiment, it is possible to bring about an example advantage of carrying out monitoring using the process of transmitting image data obtained by the security camera 50 without providing a process used only to monitor the security camera.

Second Example Embodiment

The following description will discuss in detail a second example embodiment of the present invention, with reference to the drawings. Note that any constituent element that is identical in function to a constituent element described in the first example embodiment is given the same reference numeral, and a description thereof will be omitted where appropriate.

(Configuration of Security Camera Monitoring System)

Figure 4:
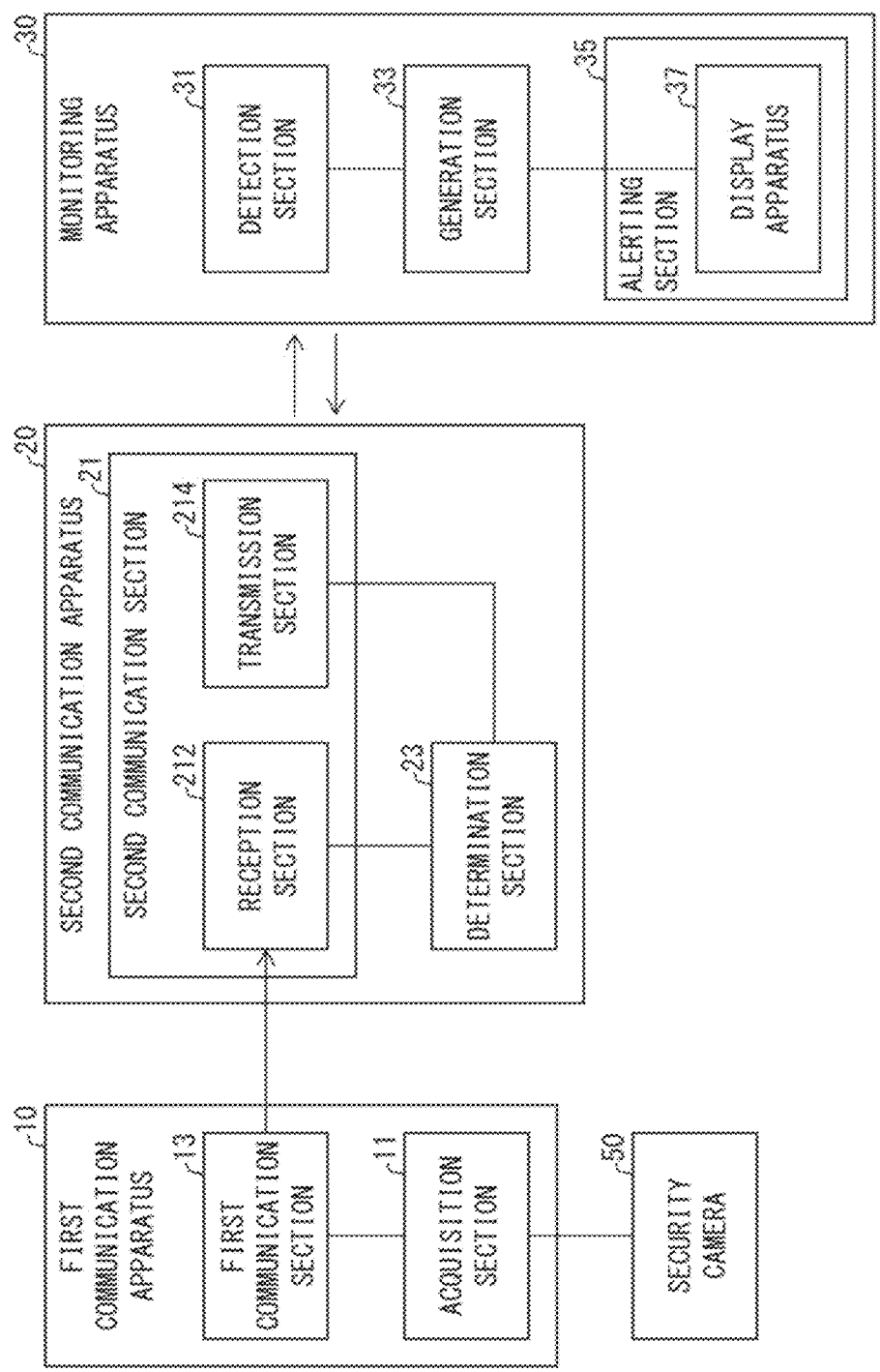
FIG. 4 is a block diagram illustrating a configuration of a security camera monitoring system in accordance with a second example embodiment of the present invention.

The following description will discuss a configuration of a security camera monitoring system 1 in accordance with the present example embodiment, with reference to FIG. 4. FIG. 4 is a block diagram illustrating the configuration of the security camera monitoring system 1. The security camera monitoring system 1 includes a first communication apparatus 10, a second communication apparatus 20, and a monitoring apparatus 30.

The first communication apparatus 10 is attached to a security camera 50, and the first communication apparatus 10 and the security camera 50 are integrated with each other.

As a configuration having a camera function of the security camera 50, it is possible to employ a configuration that can be used as a conventional security camera. For example, a PTZ camera is used. In a case of a security camera 50 constituted by a PTZ camera, an optical axis of the first communication apparatus 10 for transmitting image data does not deviate during security operation. This is because, in the case where the PTZ camera is employed, if the first communication apparatus 10 moves during the security operation, transmission to the second communication apparatus 20 becomes defective, and thus it is detected (erroneously detected) that an interference has occurred. Note, however, that the above description does not apply in an example aspect in which the position or posture of the first communication apparatus 10 itself does not change even if a position of a lens of the PTZ camera has moved during security operation employing the PTZ camera.

The first communication apparatus 10 is configured so as to be capable of transmitting, via optical space communication, image data obtained by the security camera 50 to the second communication apparatus 20 which is a communication partner. In order to achieve the feature, the first communication apparatus 10 in accordance with the present example embodiment includes an acquisition section 11 that acquires image data obtained by the security camera, and a first communication section 13 that transmits the image data obtained by the acquisition section 11. The first communication section 13 is a transmission form which has been described above for the first communication apparatus 10 in the first example embodiment, and a description thereof will be omitted here.

The first communication apparatus 10 may have a function for, after completing issuance of an alert of an interference (described later), restarting communication (transmission) with the second communication apparatus 20 with which communication has been disabled. For example, there may be an example aspect in which bidirectional communication is possible between the first communication apparatus 10 and the second communication apparatus 20 and, for example, the first communication apparatus 10 changes the transmission direction of image data in an attempt to make a connection, and a signal for restarting communication is transmitted from the second communication apparatus 20 to the first communication apparatus 10 when transmission is made in any one of transmission directions.

The second communication apparatus 20 is configured so as to be capable of receiving image data which is transmitted from the first communication apparatus 10. In the present example embodiment, the second communication apparatus 20 includes: a second communication section 21 including a reception section 212 that receives image data which has been transmitted from the first communication apparatus via optical space communication; and a determination section 23 that determines whether or not the image data has been received by the reception section 212. The reception section 212 and the determination section 23 are examples of the at least one second processor.

The determination section 23 identifies whether or not there is an interruption in reception of image data by the reception section 212, and thus determines whether or not the image data has been received by the reception section 212. The interruption of reception can be referred to also as "communication interruption". Here, the communication interruption is a communication interruption that has occurred even in a period in which or at a timing at which image data should be received in a normal state. The communication interruption is identified only in a case of conforming to a predetermined rule. Examples of the predetermined rule include a case in which, assuming that it is a period in which the security camera 50 captures an image, reception of image data by the reception section 212 is not carried out at and after a certain point in time in the period. This can be caused in a case where a position (orientation) of the security camera 50 has been moved by a malicious person or the like who has been described in the first example embodiment.

The monitoring apparatus 30 is configured so as to be capable of communicating with the second communication apparatus 20, and is configured to monitor whether or not there is an interference from outside with respect to the security camera 50. In the present example embodiment, the monitoring apparatus 30 includes an alerting section 35 that issues, based on a signal generated by the generation section 33, an alert indicating occurrence of an interference from outside with respect to the security camera 50, in addition to the detection section 31 and the generation section 33 which have been described in the first example embodiment above. The alerting section 35 is an example of the at least one first processor.

The alerting section 35 issues an alert indicating an invasion or the like. In an example, the alerting section 35 includes a display apparatus 37. The alerting section 35 causes the display apparatus 37 to display a predetermined image based on a signal generated by the generation section 33, and thus issue an alert indicating occurrence of an interference from outside with respect to the security camera 50. The predetermined image is preferably an image with which a person (monitoring person) viewing the display of the display apparatus 37 can easily ascertain the occurrence of an interference. The image may indicate the occurrence of an interference by text. Alternatively, the following configuration is preferable in which an alert indicating occurrence of an interference is issued by displaying a single color (black, white, yellow or red) image in the entire display region, and this allows a person who simultaneously monitors a large number of display apparatuses to quickly recognize the display apparatus 37 which has issued the alert, and it is therefore expected that early countermeasures can be taken.

As described above, the security camera monitoring system 1 in accordance with the present example embodiment employs the configuration of including: the first communication apparatus 10 that is attached to the security camera 50 and is capable of transmitting, via optical space communication, image data obtained by the security camera 50 to the second communication apparatus 20 which is a communication partner; the second communication apparatus 20 that is capable of receiving the image data transmitted from the first communication apparatus 10; and the monitoring apparatus 30 that is configured so as to be capable of communicating with the second communication apparatus 20 and monitors whether or not there is an interference from outside with respect to the security camera 50, the monitoring apparatus 30 including the detection section 31 for detecting a transmission failure of the image data from the first communication apparatus 10 to the second communication apparatus 20, and the generation section 33 for generating, based on a detection result by the detection section 31, a signal that indicates occurrence of the interference. In addition, the security camera monitoring system 1 in accordance with the present example embodiment employs the configuration in which: the second communication apparatus 20 includes (i) the reception section 212 that receives, from the first communication apparatus 10, image data which has been transmitted via optical space communication and (ii) the determination section 23 that determines whether or not the image data has been received by the reception section 212; and in a case where the determination section 23 has determined that the image data has not been received by the reception section 212, the detection section 31 of the monitoring apparatus 30 detects the transmission failure. Therefore, according to the security camera monitoring system 1 in accordance with the present example embodiment, it is not necessary to provide a mechanism that is used only for monitoring the security camera 50, and the mechanism that externally transmits the image data obtained by the security camera 50 has also the function to monitor the security camera 50. This makes it possible to bring about an example advantage of detecting, with a simpler mechanism than conventional techniques, whether or not there is an interference from outside with respect to the security camera. Further, according to the security camera monitoring system 1 in accordance with the present example embodiment, it is possible to bring about an example advantage that a person monitoring the monitoring apparatus 30 can ascertain that there is an interference from outside with respect to the security camera 50, in addition to the example advantage of the security camera monitoring system 1 in accordance with the first example embodiment.

Note that the above-described "communication interruption" can occur even in a state in which the direction of the communication medium (image data) which has been transmitted from the first communication section 13 of the first communication apparatus 10 integrated with the security camera 50 is oriented to the reception section 212 of the second communication section 21 of the second communication apparatus 20. Examples of such a state include a case where a communication path of the communication medium from the first communication section 13 is blocked. In the present example embodiment, the determination section 23 also determines, for such blockage of the communication path, that the reception section 212 has not received the image data. Specific examples of the blockage of the communication path include blockage caused by invasion of a person into an area where the security camera is installed. Thus, if there is an intruder in the area, the above-described communication path is blocked. Therefore, the determination section 23 determines that the image data has not been received by the reception section 212. This also makes it possible to monitor a risk of interference with the security camera 50 caused by an intruder.

As another mode of the security camera monitoring system 1, for example, the security camera monitoring system 1 is installed in a room where it is normal to be unmanned. In this case, a communication path of a communication medium directed from the first communication section 13 to the second communication apparatus 20 is disposed near a door of the room or the communication path is arranged so as to cross an area where a person can enter. In such a case, the communication path would be blocked by an intruder, and it is possible to identify that the intruder has entered. In this case, it is possible to realize a security function in addition to security by the security camera 50, which results in a double security measure.

Examples of modes of the security camera monitoring system 1 are as follows.

(Example mode 1) A data center
(Example mode 2) A large vault of a financial institution or the like
(Example mode 3) An art museum handling high-grade articles
(Example mode 4) A communication equipment integrated camera is installed so as to look into, from a ventilation duct, under a roof, or the like, a space to be protected, and a communication path is passed inside the ventilation duct or under the roof. This makes it possible to bring about an example advantage in which, while monitoring a monitoring target with the camera, it is possible to detect an abnormality based on a fact that the communication path, which is provided in the unmanned space (such as in a ventilation duct or under a roof), is blocked (i.e., a video has no longer been received).
(Example mode 5) The security camera monitoring system 1 may be provided in an environment in which a protection target is stored in a rack or a drawer as in the data center of example mode 1 described above. By installing the security camera 50 that is integrated with the first communication apparatus 10 so that communication is obstructed if the rack door or the drawer is opened, it is possible to bring about an example advantage in which a possibility that the door of the protection target has been opened or there has been an interference (contact) with the security camera can be detected based on a fact that the communication path has been blocked (i.e., a video has no longer been received), while monitoring the surroundings and passages of the protection target with the camera.

(Flow of Security Camera Monitoring Method)

Figure 5:
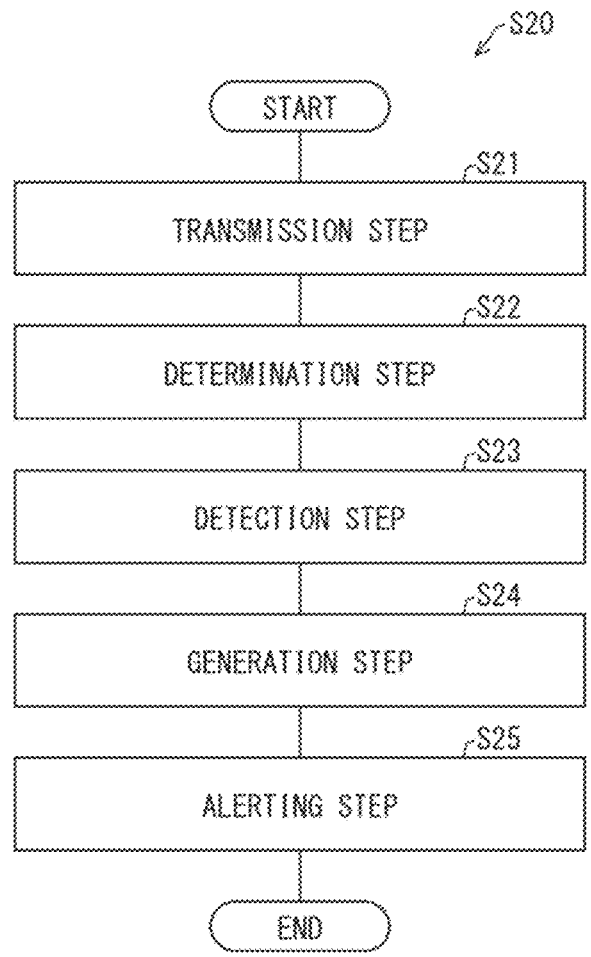
FIG. 5 is a flowchart for describing a security camera monitoring method which is carried out by the security camera monitoring system illustrated in FIG. 4.

The following description will discuss a flow of a security camera monitoring method S20 in accordance with the present example embodiment, with reference to FIG. 5. FIG. 5 is a flowchart illustrating the flow of the security camera monitoring method S20. The security camera monitoring method S20 in the present example embodiment includes a transmission step S21, a determination step S22, a detection step S23, a generation step S24, and an alerting step S25.

The transmission step S21 is carried out by the first communication apparatus 10. The transmission step S21 is identical with the transmission step S11 (FIG. 3) in the first example embodiment described above, and a description thereof will be omitted.

In the determination step S22, based on a reception result by the reception section 212 of the second communication section 21, the determination section 23 of the second communication apparatus 20 illustrated in FIG. 4 determines whether or not image data has been received by the reception section 212 as described above. Details of the determination step S22 have been described above as the description of the determination section 23, and a description thereof will be omitted here. A determination result in the determination step S22 is transmitted from the transmission section 214 to the monitoring apparatus 30. For example, in a case where it has been determined in the determination step S22 that image data has been transmitted from the first communication apparatus 10 to the second communication apparatus 20 in the transmission step S21, the image data is transmitted from the second communication apparatus 20 to the monitoring apparatus 30. In contrast, in the determination step S22, in a case where the second communication apparatus 20 has not received image data, a signal indicating that reception has not been successful is generated as a determination result by the determination section 23, and the signal is transmitted to the monitoring apparatus 30.

The detection step S23 is carried out following the determination step S22, and is carried out by the detection section 31 of the monitoring apparatus 30 illustrated in FIG. 4. In the detection step S23, upon acquisition of a signal which indicates that reception has not been successful and which has been transmitted from the second communication apparatus 20, the detection section 31 detects a "transmission failure" described above. A detection result by the detection section 31 is acquired by the generation section 33.

The generation step S24 is carried out by the generation section 33 of the monitoring apparatus 30. In the generation step S24, a signal indicating occurrence of the interference is generated based on the detection result in the detection step S23. The generated signal is acquired by the alerting section 35.

The alerting step S25 is carried out by the alerting section 35 of the monitoring apparatus 30 following the generation step S24. In the alerting step S25, a signal generated in the generation step S24 is acquired, and an alert indicating occurrence of an interference from outside with respect to the security camera 50 is issued. The content of the alert has been described for the alerting section 35 above, and a description thereof will be omitted.

In the process of generating the signal indicating the occurrence of the interference in the generation step S24, for example, in the detection step S23 by the detection section 31 of the monitoring apparatus 30, whether the transmission failure has been caused due to occurrence of an interference or due to an event other than the occurrence of an interference is detected. For example, it is possible to employ an example aspect in which, in a case of a temporary communication interruption, i.e., communication is resumed after the communication interruption has continued for a certain period of time, such a case is not detected as the interference. Other than this example aspect, it is possible to employ an example aspect in which, in a case where transmission failures of image data from the first communication apparatus 10 to the second communication apparatus 20 occur periodically, such a case is not detected as the interference.

It is possible to employ an example aspect in which the first communication apparatus 10 is capable of carrying out bidirectional communication with the second communication apparatus 20 or the monitoring apparatus 30. In the example aspect in which bidirectional communication can be carried out, in a case where a transmission direction of image data is deviated by the interference with the first communication apparatus 10, a signal that instructs the first communication apparatus 10 to change the transmission direction of the image data or a signal for controlling the transmission direction can be transmitted from the second communication apparatus 20 or the monitoring apparatus 30. According to the example aspect, for example, after an alert indicating occurrence of an interference is issued and some sort of countermeasure to the interference is completed, the deviated transmission direction in the first communication apparatus 10 is adjusted so that the transmission can be carried out again.

The present example embodiment exemplifies a one-to-one communication form between the first communication apparatus 10 and the second communication apparatus 20. Note, however, that the present example embodiment is not limited to this example, and can be applied also in a communication form constituting a mesh type network in which each communication apparatus is configured to communicate with a plurality of communication apparatuses.

[Software Implementation Example]

The functions of part of or all of the security camera monitoring system 1 can be realized by hardware such as an integrated circuit (IC chip) or can be alternatively realized by software.

Figure 6:
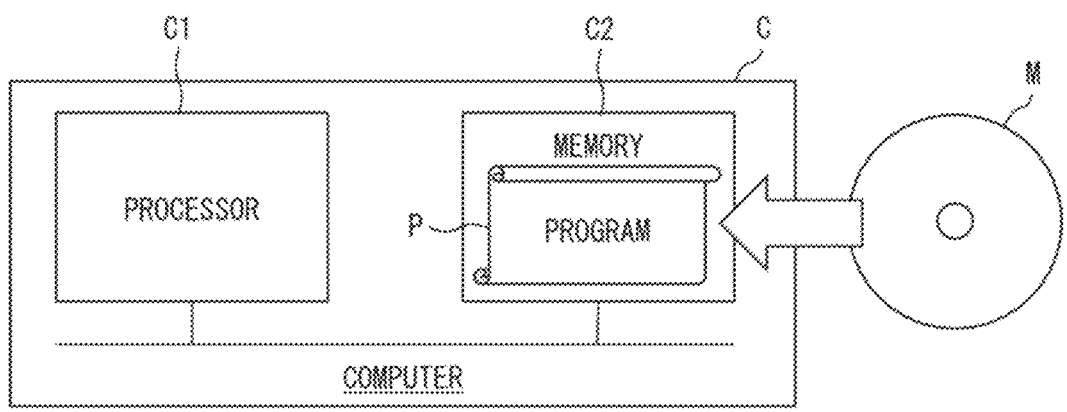
FIG. 6 is a block diagram illustrating a hardware configuration of a computer which is an implementation example of the security camera monitoring method in accordance with each of the example embodiments of the present invention.

In the latter case, the security camera monitoring system 1 is realized by, for example, a computer that executes instructions of a program that is software realizing the foregoing functions. FIG. 6 illustrates an example of such a computer (hereinafter, referred to as "computer C"). The computer C includes at least one processor C1 and at least one memory C2. The memory C2 stores a program P for causing the computer C to function as the security camera monitoring system 1. In the computer C, the processor C1 reads the program P from the memory C2 and executes the program P, so that the functions of the security camera monitoring system 1 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. Examples of such a storage medium M can include a tape, a disk, a card, a semiconductor memory, and a programmable logic circuit. The computer C can obtain the program P via the storage medium M. Alternatively, the program P can be transmitted via a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

A security camera monitoring system, including: a first communication apparatus that is attached to a security camera and is capable of transmitting, via optical space communication, image data obtained by the security camera to a second communication apparatus which is a communication partner; the second communication apparatus that is capable of receiving the image data transmitted from the first communication apparatus; and a monitoring apparatus that is configured so as to be capable of communicating with the second communication apparatus and monitors whether or not there is an interference from outside with respect to the security camera, the monitoring apparatus including a detection section for detecting a transmission failure of the image data from the first communication apparatus to the second communication apparatus, and a generation section for generating, based on a detection result by the detection section, a signal that indicates occurrence of the interference.

According to the above configuration, it is not necessary to provide a mechanism that is used only for monitoring the security camera, and the mechanism that externally transmits image data obtained by the security camera has also the function to monitor the security camera. This makes it possible to bring about an example advantage of detecting, with a simpler mechanism than conventional techniques, whether or not there is an interference from outside with respect to the security camera.

(Supplementary Note 2)

The security camera monitoring system according to supplementary note 1, in which: the second communication apparatus includes a reception section for receiving the image data which has been transmitted from the first communication apparatus via the optical space communication, and a determination section for determining whether or not the image data has been received by the reception section; and in a case where the determination section has determined that the image data has not been received by the reception section, the detection section of the monitoring apparatus detects the transmission failure.

According to the above configuration, it is possible to monitor, based on a fact that image data from the first communication apparatus has not reached the second communication apparatus, whether or not there is occurrence of an interference from outside with respect to the security camera.

(Supplementary Note 3)

The security camera monitoring system according to supplementary note 1 or 2, in which: the monitoring apparatus further includes an alerting section for issuing, based on the signal generated by the generation section, an alert indicating the occurrence of the interference from outside with respect to the security camera.

According to the above configuration, it is possible to issue an alert indicating occurrence of an interference from outside with respect to the security camera.

(Supplementary Note 4)

The security camera monitoring system according to supplementary note 3, wherein: the alerting section includes a display apparatus; the alerting section causes the display apparatus to display a predetermined image based on a signal generated by the generation section, and thus issues an alert indicating occurrence of an interference from outside with respect to the security camera.

(Supplementary Note 5)

A security camera monitoring method including: transmitting, via optical space communication, image data obtained by a security camera from a first communication apparatus to a second communication apparatus which is a communication partner, the first communication apparatus being attached to the security camera; detecting a transmission failure of the image data from the first communication apparatus to the second communication apparatus; and generating, in a case where the transmission failure has been detected in the detecting, a signal indicating occurrence of an interference from outside with respect to the security camera.

According to the above method, it is not necessary to provide a mechanism that is used only for monitoring the security camera, and the mechanism that externally transmits the image data obtained by the security camera has also the function to monitor the security camera. This makes it possible to bring about an example advantage of detecting, with a simpler mechanism than conventional techniques, whether or not there is an interference from outside with respect to the security camera.

(Supplementary Note 6)

A security camera monitoring program which causes a computer to carry out: a process of transmitting, via optical space communication, image data obtained by a security camera from a first communication apparatus to a second communication apparatus which is a communication partner, the first communication apparatus being attached to the security camera; a process of detecting a transmission failure of the image data from the first communication apparatus to the second communication apparatus; and a process of, in a case where the transmission failure has been detected in the process of detecting, generating a signal indicating occurrence of an interference from outside with respect to the security camera.

REFERENCE SIGNS LIST

1: Security camera monitoring system
10: First communication apparatus
11: Acquisition section
13: First communication section
20: Second communication apparatus
21: Second communication section
212: Reception section
214: Transmission section
23: Determination section
30: Monitoring apparatus
31: Detection section
33: Generation section
35: Alerting section
37: Display apparatus
50: Security camera

The invention claimed is:

1. A security camera monitoring system, comprising:
a first communication apparatus that is attached to a security camera and is capable of transmitting, via optical space communication, image data obtained by the security camera to a second communication apparatus which is a communication partner;
the second communication apparatus that is capable of receiving the image data transmitted from the first communication apparatus; and a monitoring apparatus that is configured so as to be capable of communicating with the second communication apparatus and monitors whether or not there is an interference from outside with respect to the security camera, the monitoring apparatus including at least one first processor, the at least one first processor carrying out a detection process of detecting a transmission failure of the image data from the first communication apparatus to the second communication apparatus, and a generation process of generating, based on a detection result in the detection process, a signal that indicates occurrence of the interference.

2. The security camera monitoring system according to claim 1, wherein:

the second communication apparatus includes a reception section for receiving the image data which has been transmitted from the first communication apparatus via the optical space communication, and at least one second processor;

the at least one second processor carries out a determination process of determining whether or not the image data has been received by the reception section; and in a case where it has been determined in the determination process that the image data has not been received by the reception section, the at least one first processor of the monitoring apparatus detects the transmission failure in the detection process.

3. The security camera monitoring system according to claim 1, wherein:

the at least one first processor of the monitoring apparatus further carries out an alerting process of issuing, based on the signal generated in the generation process, an alert indicating the occurrence of the interference from outside with respect to the security camera.

4. The security camera monitoring system according to claim 3, further comprising:

a display apparatus, in the alerting process, the at least one first processor of the monitoring apparatus causes the display apparatus to display a predetermined image based on the signal generated in the generation process, and thus issues an alert indicating the occurrence of the interference from outside with respect to the security camera.

5. A security camera monitoring method comprising:

transmitting, via optical space communication, image data obtained by a security camera from a first communication apparatus to a second communication apparatus which is a communication partner, the first communication apparatus being attached to the security camera;

detecting a transmission failure of the image data from the first communication apparatus to the second communication apparatus; and generating, in a case where the transmission failure has been detected in the detecting, a signal indicating occurrence of an interference from outside with respect to the security camera.

6. The security camera monitoring method according to claim 5, further comprising:

determining whether or not the image data which has been transmitted from the first communication apparatus via the optical space communication has been received by the second communication apparatus, in a case where it has been determined in the determining that the image data has not been received by the second communication apparatus, the transmission failure of the image data from the first communication apparatus to the second communication apparatus being detected.

7. The security camera monitoring method according to claim 5, further comprising:

issuing, based on the signal indicating the occurrence of the interference from outside with respect to the security camera, an alert indicating the occurrence of the interference from outside with respect to the security camera.

8. The security camera monitoring method according to claim 7, wherein:

a display apparatus is caused to display a predetermined image based on the signal indicating the occurrence of the interference from outside with respect to the security camera, and thus an alert indicating the occurrence of the interference from outside with respect to the security camera is issued.

9. A non-transitory storage medium storing a security camera monitoring program which causes a computer to carry out:

a process of transmitting, via optical space communication, image data obtained by a security camera from a first communication apparatus to a second communication apparatus which is a communication partner, the first communication apparatus being attached to the security camera;

a process of detecting a transmission failure of the image data from the first communication apparatus to the second communication apparatus; and a process of, in a case where the transmission failure has been detected in the process of detecting, generating a signal indicating occurrence of an interference from outside with respect to the security camera.

* * * * *